United States Patent
Seo et al.

(10) Patent No.: US 7,792,418 B2
(45) Date of Patent: Sep. 7, 2010

(54) METHOD AND APPARATUS FOR REPRODUCING DATA FROM RECORDING MEDIUM USING LOCAL STORAGE

(75) Inventors: Kang Soo Seo, Anyang-si (KR); Jea Yong Yoo, Seoul (KR); Byung Jin Kim, Seongnam-si (KR)

(73) Assignee: LG Electronics, Inc., Seoul (KR)

( * ) Notice: Subject to any disclaimer, the term of this patent is extended or adjusted under 35 U.S.C. 154(b) by 1067 days.

(21) Appl. No.: 11/246,231

(22) Filed: Oct. 11, 2005

(65) Prior Publication Data

US 2006/0077772 A1    Apr. 13, 2006

Related U.S. Application Data

(60) Provisional application No. 60/617,080, filed on Oct. 12, 2004, provisional application No. 60/617,075, filed on Oct. 12, 2004.

(30) Foreign Application Priority Data

Apr. 27, 2005    (KR) .................. 10-2005-0035178

(51) Int. Cl.
*H04N 5/00* (2006.01)
(52) U.S. Cl. ..................................... 386/126
(58) Field of Classification Search .............. 386/55, 386/52, 95, 125–126, 69–70

See application file for complete search history.

(56) References Cited

U.S. PATENT DOCUMENTS

| 5,596,565 A | 1/1997 | Yonemitsu et al. |
| 5,644,782 A | 7/1997 | Yeates et al. |
| 5,778,389 A | 7/1998 | Pruett et al. |

(Continued)

FOREIGN PATENT DOCUMENTS

CA    2 373 641 A1    9/2001

(Continued)

OTHER PUBLICATIONS

Office Action issued Dec. 10, 2008 by the U.S. Patent and Trademark Office in counterpart U.S. Appl. No. 11/224,245.

(Continued)

*Primary Examiner*—Thai Tran
*Assistant Examiner*—Tat Chio
(74) *Attorney, Agent, or Firm*—Harness, Dickey & Pierce, P.L.C.

(57) ABSTRACT

A method and apparatus for reproducing data from a recording medium using a local storage is disclosed. The method for reproducing data of a recording medium using a local storage includes the steps of: a) reading a binding unit associated with a specific recording medium from the local storage; b) performing a binding operation for combining the binding unit with a file structure contained in the recording medium, and forming a virtual package including a playlist file capable of allowing a plurality of clips to be reproduced by a single playitem; and c) reproducing data stored in the recording medium and/or data stored in the local storage using the formed virtual package. Therefore, the original data recorded in the recording medium and the additional data stored in the local storage can be effective reproduced, resulting in greater convenience of use.

18 Claims, 11 Drawing Sheets

U.S. PATENT DOCUMENTS

| | | |
|---|---|---|
| 5,930,768 A | 7/1999 | Hooban |
| 5,982,980 A | 11/1999 | Tada |
| 6,021,438 A | 2/2000 | Duvvoori et al. |
| 6,269,371 B1 | 7/2001 | Ohnishi |
| 6,381,202 B1 | 4/2002 | Shimoda |
| 6,675,382 B1 | 1/2004 | Foster |
| 6,775,803 B1 | 8/2004 | Chung et al. |
| 6,928,613 B1 | 8/2005 | Ishii et al. |
| 6,938,005 B2 | 8/2005 | Iverson et al. |
| 6,980,979 B2 | 12/2005 | Huang et al. |
| 7,039,863 B1 | 5/2006 | Caro et al. |
| 7,191,392 B1 | 3/2007 | Coar |
| 7,233,553 B2 | 6/2007 | Gotoh et al. |
| 7,349,923 B2 | 3/2008 | Spring et al. |
| 7,477,833 B2 * | 1/2009 | Kato et al. .................. 386/125 |
| 7,555,483 B2 | 6/2009 | Maeda et al. |
| 7,639,923 B2 | 12/2009 | Ikeda et al. |
| 2001/0015940 A1 | 8/2001 | Yokota et al. |
| 2001/0026502 A1 | 10/2001 | Zimmer |
| 2001/0037356 A1 | 11/2001 | White et al. |
| 2002/0001395 A1 | 1/2002 | Davis et al. |
| 2002/0048224 A1 | 4/2002 | Dygert et al. |
| 2002/0143795 A1 | 10/2002 | Fletcher et al. |
| 2002/0161571 A1 | 10/2002 | Matsushima et al. |
| 2002/0194618 A1 | 12/2002 | Okada et al. |
| 2003/0041110 A1 | 2/2003 | Wenocur et al. |
| 2003/0056029 A1 | 3/2003 | Huang et al. |
| 2003/0072453 A1 | 4/2003 | Kelly et al. |
| 2003/0105743 A1 | 6/2003 | Ireton |
| 2003/0109306 A1 | 6/2003 | Karmarkar |
| 2003/0152366 A1 * | 8/2003 | Kanazawa et al. ............ 386/69 |
| 2003/0163486 A1 | 8/2003 | Van Der Meulen |
| 2003/0180031 A1 | 9/2003 | Kikuchi et al. |
| 2003/0202431 A1 | 10/2003 | Kim et al. |
| 2003/0228134 A1 | 12/2003 | Kim et al. |
| 2003/0235402 A1 | 12/2003 | Seo et al. |
| 2003/0235406 A1 | 12/2003 | Seo et al. |
| 2004/0051812 A1 | 3/2004 | Hayward |
| 2004/0054541 A1 | 3/2004 | Kryze et al. |
| 2004/0078293 A1 | 4/2004 | Iverson et al. |
| 2004/0101285 A1 | 5/2004 | Seo et al. |
| 2004/0120695 A1 | 6/2004 | Tsumagari et al. |
| 2004/0199566 A1 | 10/2004 | Carlson et al. |
| 2004/0210584 A1 | 10/2004 | Nir et al. |
| 2005/0018854 A1 | 1/2005 | Yamamoto et al. |
| 2005/0108466 A1 | 5/2005 | Takashima et al. |
| 2005/0141879 A1 | 6/2005 | Chung et al. |
| 2005/0169132 A1 | 8/2005 | Kuraoka et al. |
| 2005/0262149 A1 | 11/2005 | Jung et al. |
| 2006/0013562 A1 | 1/2006 | Sugino et al. |
| 2006/0020932 A1 | 1/2006 | Bentz et al. |
| 2006/0045481 A1 | 3/2006 | Yahata et al. |
| 2006/0051062 A1 | 3/2006 | Kusaka et al. |
| 2006/0140079 A1 | 6/2006 | Hamada et al. |
| 2006/0143666 A1 | 6/2006 | Okada et al. |
| 2006/0153535 A1 | 7/2006 | Chun et al. |
| 2006/0155790 A1 | 7/2006 | Jung et al. |
| 2006/0156354 A1 | 7/2006 | Jung et al. |
| 2006/0227973 A1 | 10/2006 | Takashima et al. |
| 2007/0006276 A1 | 1/2007 | Ashley et al. |
| 2007/0038989 A1 | 2/2007 | Newton et al. |
| 2007/0143740 A1 | 6/2007 | Hoerentrup et al. |
| 2008/0025182 A1 | 1/2008 | Seo et al. |
| 2008/0031599 A1 | 2/2008 | Ikeda et al. |

FOREIGN PATENT DOCUMENTS

| | | |
|---|---|---|
| CN | 1898742 | 1/2007 |
| CN | 1954384 (A) | 4/2007 |
| EP | 0 101 133 | 8/1983 |
| EP | 0 737 912 A2 | 10/1996 |
| EP | 0 737 975 A2 | 10/1996 |
| EP | 0 801 384 A2 | 10/1997 |
| EP | 1 014 372 | 6/2000 |
| EP | 1 032 229 A2 | 8/2000 |
| EP | 1 408 505 A1 | 4/2004 |
| EP | 1 426 961 A1 | 6/2004 |
| EP | 1 437 737 A2 | 7/2004 |
| EP | 1 513 152 A1 | 3/2005 |
| EP | 1 536 427 A1 | 6/2005 |
| EP | 1 551 027 A1 | 7/2005 |
| EP | 1 553 769 A1 | 7/2005 |
| EP | 1 718 074 A1 | 11/2006 |
| EP | 1 789 958 | 5/2007 |
| JP | 11-065996 | 3/1999 |
| JP | 11-249948 | 9/1999 |
| JP | 11-249963 | 9/1999 |
| JP | 11-288580 | 10/1999 |
| JP | 2002049518 | 2/2002 |
| JP | 2002-288941 | 10/2002 |
| JP | 2004-214918 | 7/2004 |
| JP | 2006-040473 | 2/2006 |
| KR | 10-2004-0039885 A | 5/2004 |
| RU | 2006117983 (A) | 12/2007 |
| TW | 583538 | 4/2004 |
| WO | WO 95/12197 | 5/1995 |
| WO | 96/11446 A2 | 4/1996 |
| WO | WO 96/11446 | 4/1996 |
| WO | WO 01/67668 A1 | 9/2001 |
| WO | WO 2004/001752 A1 | 12/2003 |
| WO | WO 2004/001754 A1 | 12/2003 |
| WO | WO 2004/023479 A1 | 3/2004 |
| WO | WO 2004/025651 A1 | 3/2004 |
| WO | WO 2004/030356 A1 | 4/2004 |
| WO | WO 2004/042723 A1 | 5/2004 |
| WO | 2004/047100 A1 | 6/2004 |
| WO | WO 2004/047104 A1 | 6/2004 |
| WO | WO 2004/081936 | 9/2004 |
| WO | WO 2004/100048 A2 | 11/2004 |
| WO | WO 2004/114658 A1 | 12/2004 |
| WO | WO 2005/002220 A1 | 1/2005 |
| WO | WO 2005/045834 | 5/2005 |
| WO | WO 2005/050528 A2 | 6/2005 |
| WO | WO 2005/052941 A1 | 6/2005 |
| WO | WO 2005/055205 A2 | 6/2005 |
| WO | WO 2005/078727 A1 | 8/2005 |
| WO | WO 2005/079063 A1 | 8/2005 |
| WO | WO 2005/091637 A1 | 9/2005 |
| WO | WO 2005/124763 A1 | 12/2005 |
| WO | WO 2006/031048 | 3/2006 |
| WO | WO 2006/049476 | 5/2006 |

OTHER PUBLICATIONS

Office Action issued Nov. 13, 2008 by the U.S. Patent and Trademark Office in counterpart U.S. Appl. No. 11/325,341.

Office Action issued Feb. 5, 2009 by the U.S. Patent and Trademark Office in counterpart U.S. Appl. No. 11/292,105.

International Search Report issued Jan. 10, 2007 in counterpart International Application No. PCT/KR2005/003399.

Office Action issued May 28, 2009 by the USPTO in U.S. Appl. No. 11/325,493.

Office Action issued May 12, 2009 by the USPTO in U.S. Appl. No. 11/268,552.

Office Action issued May 12, 2009 by the USPTO in U.S. Appl. No. 11/224,245.

Search Report issued Apr. 8, 2008 by the European Patent Office in counterpart European Patent App. No. 05776011.8-2223.

Search Report issued Mar. 26, 2008 by the European Patent Office in counterpart European Patent App. No. 07107743.2-2223.

Office Action for corresponding Chinese Application No. CN200580030609.2 dated May 8, 2009.

Office Action for corresponding Russian Application No. 2007107814/28(008486) dated Jun. 23, 2009 (with English translation).
Office Action issued Aug. 8, 2008 by the Chinese Patent Office in counterpart Chinese Application No. 200580031490.0 (with English language translation).
Search Report issued Sep. 17, 2008 by the European Patent Office in counterpart European Patent Application No. 05823683.7.
USPTO Office Action dated Dec. 11, 2009 for corresponding U.S. Appl. No. 11/224,245.
Little et al., "Forensic 3D Scene Reconstruction", Sandia National Laboratories, Nov. 2, 1999, pp. 1-8.
Office Action issued May 12, 2009 by the USPTO in counterpart U.S. Appl. No. 11/224,245.
Office Action issued Sep. 18, 2009 by the USPTO in counterpart U.S. Appl. No. 11/325,341.
Notice of Allowance for Russian patent application No. 2007107811 dated Sep. 24, 2009.
European Search Report dated Nov. 10, 2009.
Blu-Ray Disc Founders: "White paper Blu-ray Disc Format: File System Specifications for BD-RE, R, ROM" Internet Citation, [Online] Aug. 1, 2004, XP002330712: URL:http://www.blu-raydisc.com/Section_13628/Index.html> *the whole document.
Blu-Ray Disc: "White paper Blu-Ray disc format—2.A logical and audio visual application format specifications for BD-RE" Internet Citation [Online] Aug. 1, 2004, pp. 1-26, XP007904846:URL:http://www.blurayjukebox.com/html/blu-ray_whitepapers.html> *the whole document*.

Blu-Ray Disc Founders: "White Paper Blu-Ray Disc Format: General" Internet Citation, [Online] Aug. 1, 2004, pp. 1-37, XP002547994: URL:http://www.blu-raydisc.com/Assets/Downloadablefile/general_bluraydiscformat-15263.pdf> *paragraph [1.3.2]; figures 1.3.2.1.1,1.3.2.1.2* *paragraph [01.8]*.
Blu-Ray Disc: "White paper Blu-ray Disc Format. 2.B Audio Visual Application Format Specifications for BD-ROM", Mar. 2005, pp. 1-35.
Blu-Ray Disc: "Application Definition Blu-ray Disc Format BD-J Baseline Application and Logical Model Definition for BD-ROM", Mar. 2005, pp. 1-45.
Office Action for USPTO for U.S. Appl. No. 11/325,493 dated Nov. 23, 2009.
Search Report for European Patent Office for application No. 05819111.5-1247 dated Nov. 20, 2009.
Search Report for European Patent Office for application No. 05786908.3-1247 dated Nov. 30, 2009.
Russian Notice of Allowance dated Feb. 2, 2010 issued in the corresponding Russian Application No. 2007115808/28(0171168).
USPTO Office Action dated Feb. 17, 2010.
U.S. Office Action for corresponding U.S. Appl. No. 11/325,493 dated Apr. 1, 2010.
European Search Report for corresponding Application No. 05823853.6 dated Apr. 29, 2010.

* cited by examiner

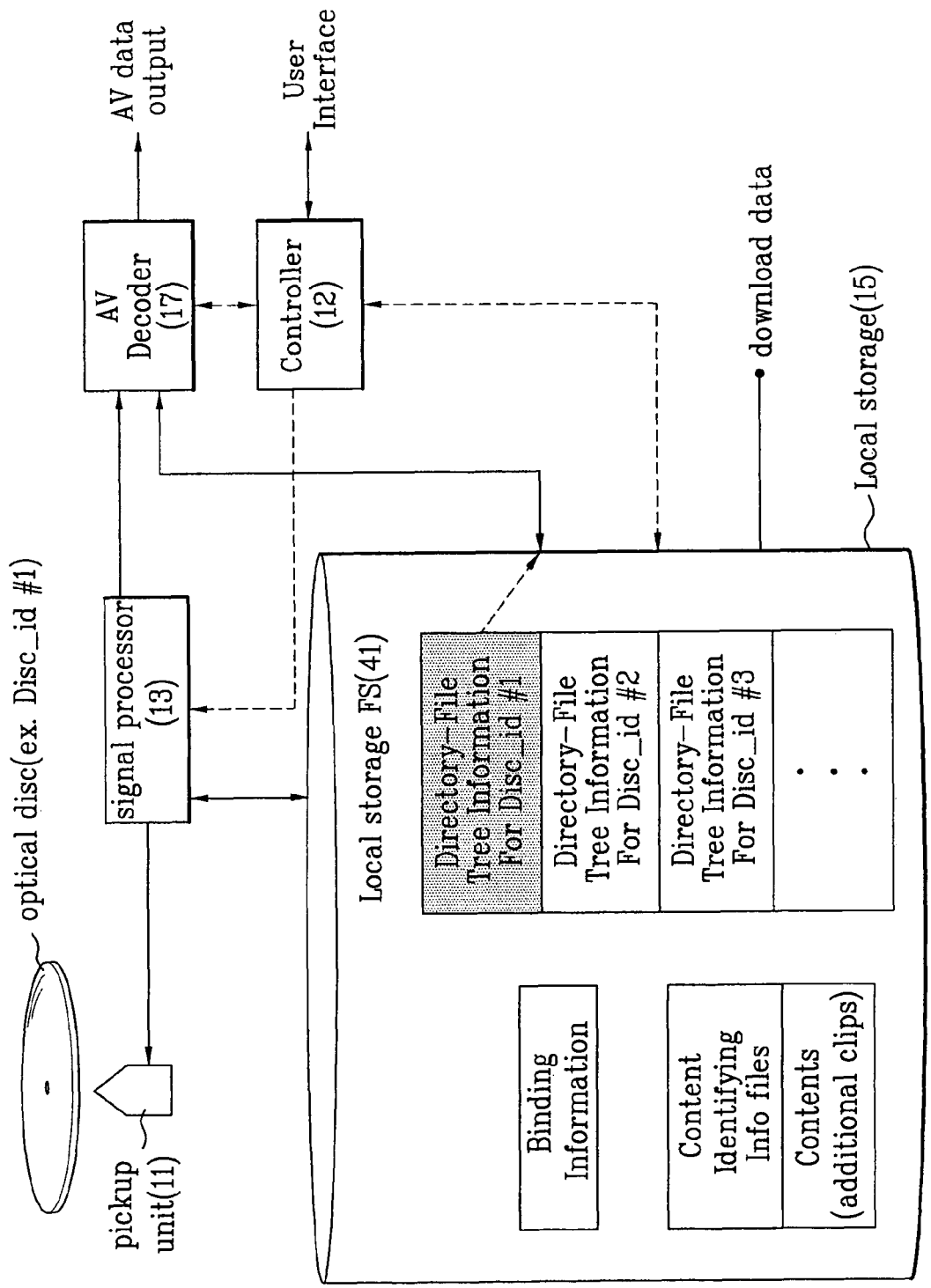

FIG. 6B

\<additional data type\>

| |
|---|
| Type #1 : Presentatin Component Update<br>• Additional Audio<br>• Additional PG & Text Subtitle<br>• Additional IG |
| Type #2 : Multiplexed Clip AV Streams Update<br>• TS for Movie application<br>• TS for Time based slideshow<br>• TS for a main path of Browsable slideshow |
| Type #3 : Database Only Update<br>• PlayList<br>• Movie Object<br>• Index Table |
| Type #4 : Auxdata Update<br>• Click Sound<br>• Font File |
| Type #5 : BD-J appliction/Metadata |

METHOD AND APPARATUS FOR REPRODUCING DATA FROM RECORDING MEDIUM USING LOCAL STORAGE

This application claims the benefit of Korean Patent Application No. 10-2005-0035178, filed on, Apr. 27, 2005, which is hereby incorporated by reference as if fully set forth herein.

This application claims the benefit of U.S. Provisional Application No. 60/617,080, filed on Oct. 12, 2004, in the name of inventors Kang Soo SEO, Jea Yong Yoo, and Byung Jin KIM, entitled "Playback control of the blu-ray disc in connection with local storage and network(1)", and U.S. Provisional Application No. 60/617,075, filed on Oct. 12, 2004, in the name of inventors Kang Soo SEO, Jea Yong Yoo, and Byung Jin KIM, entitled "Playback control of the blu-ray disc in connection with local storage and network(2)", which are hereby incorporated by reference as if fully set forth herein.

BACKGROUND OF THE INVENTION

1. Field of the Invention

The present invention relates to a method and apparatus for reproducing data from a recording medium, and more particularly to a method and apparatus for reproducing data from a recording medium using a local storage contained in an optical recording/reproducing device.

2. Discussion of the Related Art

Generally, there has been widely used an optical disc acting as a recording medium capable of recording a large amount of data therein. Particularly, there has recently been developed a high-density optical recording medium capable of recording/storing high-quality video data and high-quality audio data for a long period of time, for example, a Blu-ray Disc (BD).

The BD based on the next-generation recording medium technique has been considered to be the next-generation optical recording solution capable of storing much more data than a conventional DVD. In recent times, many developers have conducted intensive research into the international standard technical specification associated with the BD along with those of other digital devices.

In association with the above-mentioned situation, there has recently been developed an optical recording/reproducing device based on the BD international standard, but the BD international standard has not yet been completed, such that many limitations and problems occur in developing the optical recording/reproducing device.

Particularly, the above-mentioned optical recording/reproducing device must consider not only a basic function for recording/reproducing data of the BD, but also an additional function for enabling the optical recording/reproducing device to interact with peripheral digital devices. In other words, the optical recording/reproducing device must receive an external input signal, must display the received signal, and must reproduce desired data using the external input signal and the BD.

However, an apparatus for reproducing data from the recording medium to simultaneously reproduce the external input signal and data of the BD has not yet been established, such that many limitations and problems occur in developing a BD-based optical recording/reproducing device.

SUMMARY OF THE INVENTION

Accordingly, the present invention is directed to a method and apparatus for reproducing data from a recording medium using a local storage that substantially obviate one or more problems due to limitations and disadvantages of the related art.

An object of the present invention is to provide a method and apparatus for reproducing data suitable for a recording medium.

Another object of the present invention is to provide a method for providing a virtual package a playback system which includes a local storage capable of receiving/storing data from an external part, and includes a playlist file capable of simultaneously reproducing data stored in the local storage and data recorded in a recording medium.

Yet another object of the present invention is to provide an apparatus which includes a playitem capable of reproducing a plurality of data clips in the playlist file such that it simultaneously reproduces both data recorded in a recording medium and data stored in a local storage using the playitem, and a method for use in the apparatus.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for reproducing data of a recording medium using a local storage includes the steps of: a) reading a binding unit associated with a specific recording medium from the local storage; b) performing a binding operation for combining the binding unit with a file structure contained in the recording medium, and forming a virtual package including a playlist file capable of allowing a plurality of clips to be reproduced by a single playitem; and c) reproducing data stored in the recording medium and/or data stored in the local storage using the formed virtual package.

In another aspect of the present invention, there is provided a method for forming a virtual package comprising the steps of: a) reading a disc package indicative of a recording-medium file structure from a recording medium, and reading a binding unit associated with the recording medium from a local storage; and b) performing a binding operation for combining the binding unit with the disc package, forming a playlist file including a playitem for reproducing a plurality of clips, and forming a virtual package including the formed playlist file.

In yet another aspect of the present invention, there is provided an apparatus for reproducing data of a recording medium using a local storage comprising: a pickup unit for reading original data from a recording medium; a local storage for storing additional data associated with the original data; and a controller for forming a virtual package including a playlist file equipped with a playitem capable of reproducing a plurality of clips in order to reproduce the original data and the additional data.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4b is a block diagram illustrating an apparatus for reproducing data using a local storage from among overall components contained in the optical recording/reproducing device according to the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A method and apparatus for reproducing data from a recording medium using a local storage will hereinafter be described with reference to the annexed drawings.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

A recording medium for use in the present invention is indicative of all recordable mediums, for example, an optical disc, and a magnetic tape, etc., according to various recording schemes.

For the convenience of description and better understanding of the present invention, the optical disc, such as a BD, will hereinafter be exemplarily used as the above-mentioned recording medium in the present invention. It should be noted that technical ideas of the present invention can be applied to other recording mediums without departing from the scope and spirit of the invention.

Figure 1:
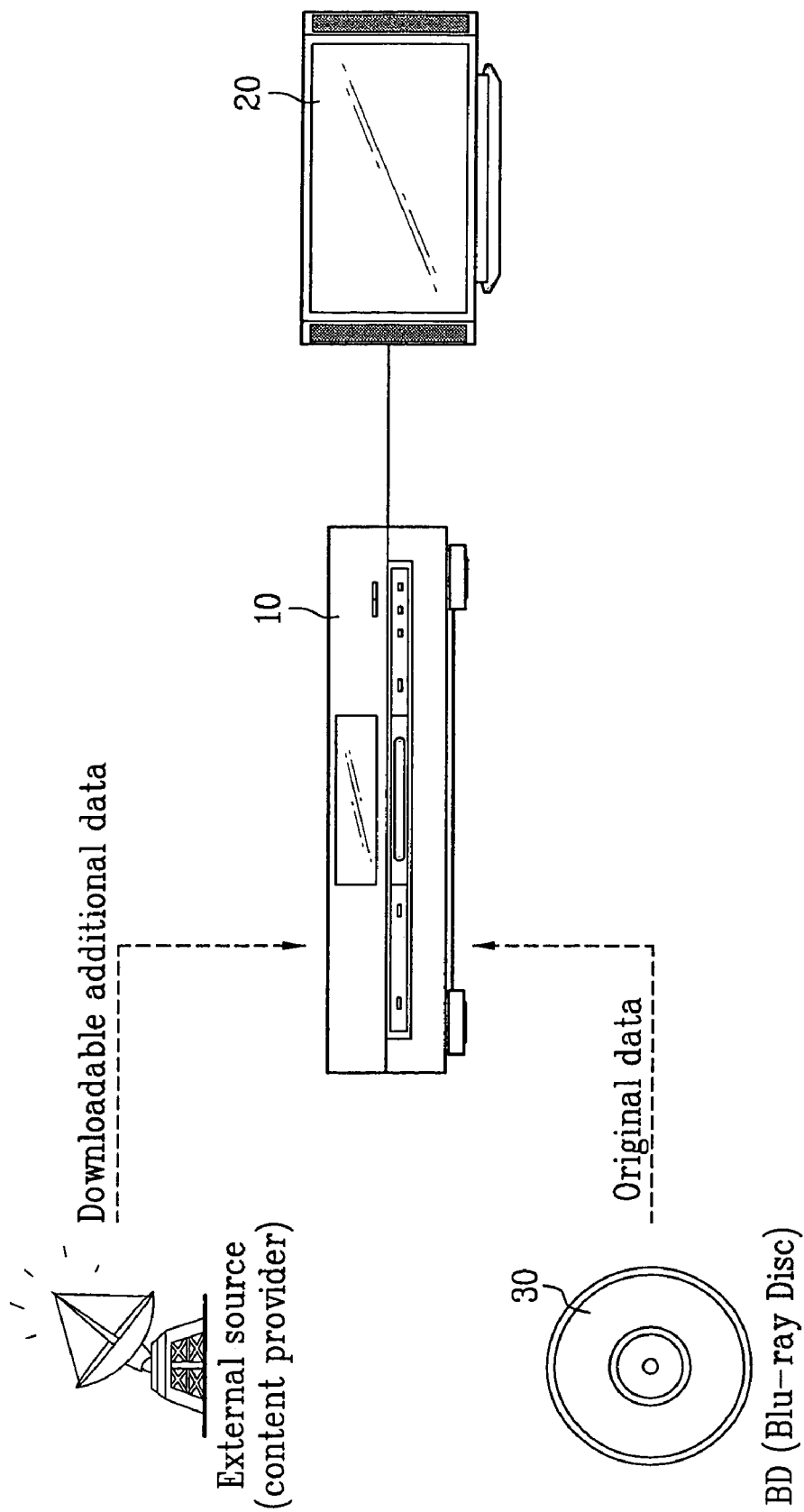
FIG. 1 is a conceptual diagram illustrating a method and apparatus for reproducing data from a recording medium according to the present invention.

The term "local storage" is indicative of a storage unit contained in an optical recording/reproducing device 10 shown in FIG. 1. In more detail, the term "local storage" is indicative of a component capable of receiving necessary information or data from a user, and storing the received information or data. For example, a general local storage may be indicative of a Hard Disc Drive (HDD), but it should be noted that the term "local storage" of the present invention is not limited to the HDD, and is applicable to other examples as necessary.

Particularly, the term "local storage" is indicative of a storage unit for storing data associated with a recording medium such as a BD. The data associated with the recording medium is generally downloaded from an external device.

In association with the above-mentioned description, it is obvious to those skilled in the art that the local storage may directly read some permission data from the recording medium, and may generate system data (e.g., metadata) associated with record/reproduction operations of the recording medium, such that the system data may be stored in the local storage.

The term "binding unit" is indicative of a set of files stored in the local storage. Particularly, the binding unit is indicative of a set of information (i.e., information set) associated with a specific recording medium. In this case, the information set is combined with or is added to a file contained in the recording medium, such that it can simultaneously reproduce data of the recording medium and data of the local storage. A detailed description of the binding unit will be given later.

For the convenience of description, data recorded in the recording medium is referred to as "original data", data associated with the recording medium from among a plurality of data units stored in the local storage is referred to as "additional data".

FIG. 1 is a conceptual diagram illustrating a method and apparatus for reproducing data according to the present invention. Unified usages of the optical recording/reproducing 10 and peripheral devices are shown in FIG. 1.

The optical recording/reproducing device 10 can record/reproduce data in/from various optical discs having different formats. If necessary, the optical recording/reproducing device 10 can record/reproduce specific data in/from only a specific optical disc such as a BD, or can reproduce the data from the optical disc without recording the data in the same. It should be noted that the present invention exemplarily uses a BD-player capable of reproducing data from the BD or a BD-recorder capable of recording data in the BD in consideration of correlation between the BD and peripheral devices for the convenience of description. It is well known in the art that the optical recording/reproduction device 10 is also applicable to a drive embedded in a specific device such as a computer.

The optical recording/reproducing device 10 records or reproduces data in/from the optical disc 30, receives an external input signal, performs a signal process on the received signal, and transmits the signal processed result to the external display 20, such that a user can view the signal processed result on the display 20. In this case, there is no limitation in a receivable external signal. For example, representative external input signals may be determined to be a DTV-associated signal and an Internet-associated signal, etc. Specifically, the Internet is indicative of a communication network to which a user easily gains access, such that the user can download specific Internet data using the optical recording/reproducing device 10, and can use the downloaded data.

In association with the above-mentioned description, a person for providing content data used as an external source is generally referred to as a content provider (CP).

When original data is recorded in the optical disc 30 seated in the optical recording/reproducing device 10, and additional data associated with the original data is present in other storage places (e.g., Internet), the present invention aims to reproduce the original data and the additional data at the same time.

For example, it is assumed that multiplexed AV (Audio/Video) streams are recorded as the original data recorded in the optical disc, and additional data for use in the Internet is an audio stream different from an audio stream (e.g., Korean) of the original data. In this case, some users may download a specific audio stream (e.g., English) acting as additional data from the Internet, may desire to reproduce the downloaded audio stream along with the AV stream acting as original data, or may desire to reproduce only the additional data. In order to implement the above-mentioned desires of the users, correlation between the original data and the additional data must be established, and there is needed a systemized method for managing/reproducing the above-mentioned data according to a user request.

For the convenience of description, although a signal recorded in the disc is called the original data, and other signals existing in the outside of the disc are called the additional data, it should be noted that the original data and the additional data are not limited to only specific data.

Generally, additional data may be indicative of audio data, presentation graphic (PG) data, interactive graphic data, or text subtitle, etc., but the additional data may also be indicative of a multiplexed AV stream including the above-mentioned data and video data. In other words, data associated with the original data simultaneously existing in the outside of the optical disc may act as additional data.

In order to satisfy the above-mentioned user requests, a predetermined file structure must be established between the original data and the additional data. Accordingly, a file structure and data record structure for use in the BD will hereinafter be described with reference to FIGS. 2 and 3.

Figure 2:
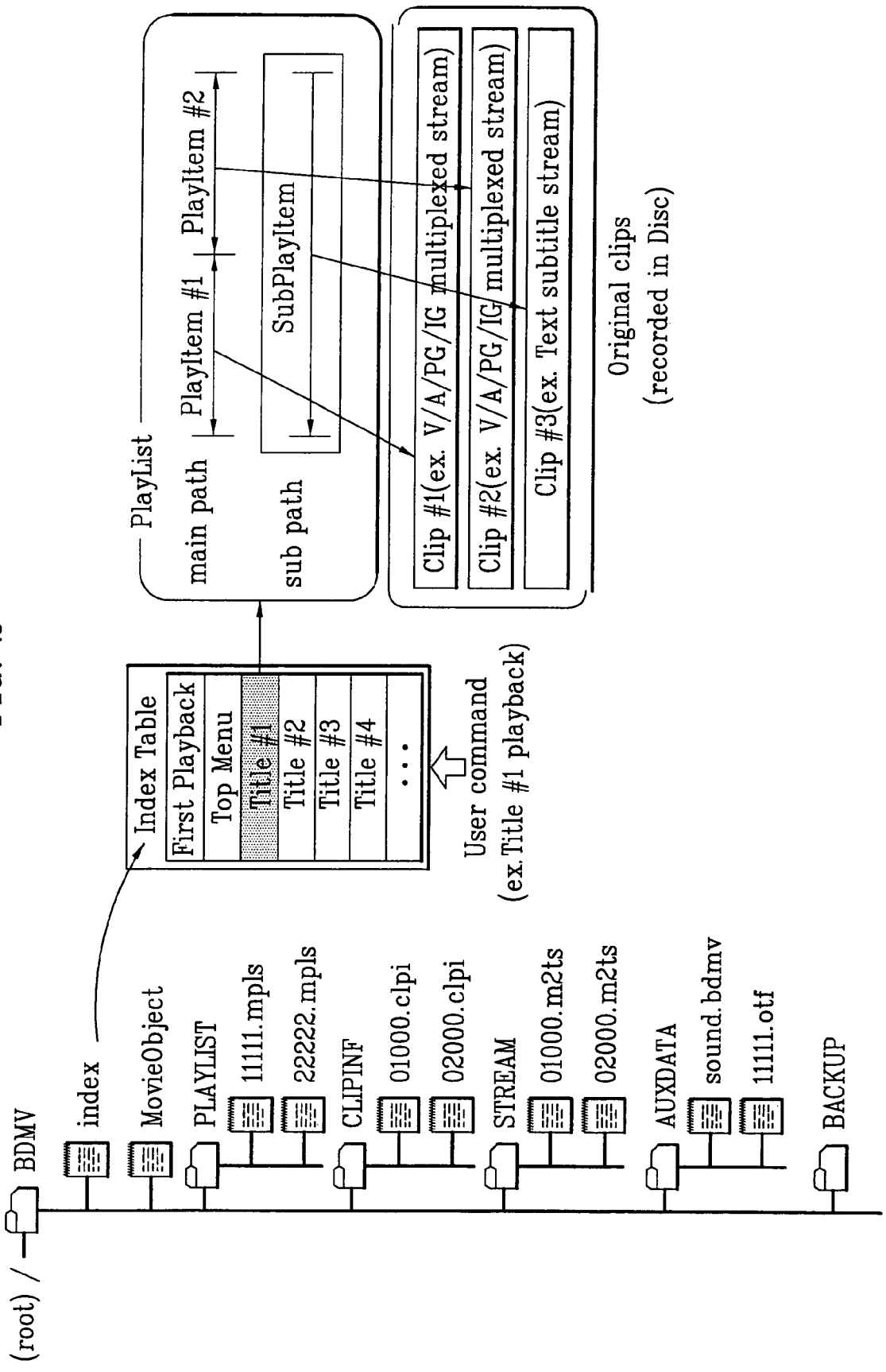
FIG. 2 is a conceptual diagram illustrating a file structure recorded in an optical disc acting as a recording medium and a method for reproducing a specific title using the file structure.

FIG. 2 is a conceptual diagram illustrating a file structure for reproducing/managing the original data recorded in an optical disc, and a method for reproducing a specific title according to the file structure.

An example of the above-mentioned file structure is shown in FIG. 2. The file structure according to the present invention includes one or more BD directories (BDMV) under a single root directory. The BD directory (BDMV) includes not only an index file "index" acting as a general file (i.e., an upper file) capable of guaranteeing user interactivity, but also the above-mentioned object. The file structure includes a variety of directories for storing information of actual data recorded in a disc and other information associated with a method for reproducing the data, for example, a playlist directory (PLAYLIST), a clip information directory (CLIPINF), a stream directory (STREAM), an auxiliary directory (AUXDATA), and a backup directory (BACKUP). The above-mentioned directories and a variety of files included in the directory will hereinafter be described.

The AUXDATA directory includes an additional data file for reproducing data of the disc. For example, the AUXDATA directory includes a "Sound.bdmv" file for providing a user with sound data when an interactive graphic function is executed, and an "11111.otf" file for providing the user with font information when data of the disc is reproduced.

The stream directory (STREAM) includes a plurality of AV stream files recorded in a disc according to a specific format. Generally, individual streams are recorded using an MPEG-2 based transport packet, and the stream directory (STREAM) uses extension names of stream files (01000.m2ts and 02000.m2ts) as a specific extension name "*.m2ts". Particularly, if video/audio/graphic information from among the above-mentioned streams is multiplexed, the multiplexed information is called an AV stream, and a single title is composed of at least one AV stream file.

The clip information (Clip-info) directory (CLIPINF) is composed of a plurality of clip-info files (01000.clpi and 02000.clpi) connected to the above-mentioned stream files on a one-to-one basis. Particularly, the clip-info files (*.clpi) record attribute information and timing information of the stream files (*.m2ts) therein. The clip-info files (*.clpi) connected to the stream files (*.m2ts) on a one-to-one basis are generically named a "Clip". In other words, this means that a single clip is indicative of data composed of a stream file (*.m2ts) and a clip-info file (*.clpi). A clip recorded in the disc is referred to as an original clip. A clip, which is downloaded and stored in a local storage, is referred to as an additional clip.

The playlist directory (PLAYLIST) includes a plurality of playlist files (*.mpls). Each playlist file (*.mpls) includes one or more playitems (PlayItem) and one or more sub-playitems (SubPlayItem). Each playitem (PlayItem) and each sub-playitem (SubPlayItem) are adapted to designate a playing interval during which a specific clip is reproduced. The playitem (PlayItem) and the sub-playitem (SubPlayItem) include information associated with a specific clip to be reproduced, i.e., information associated with a reproduction start time (IN-Time) and other information associated with a reproduction termination time (OUT-Time) of the specific clip.

In association with the above-mentioned description, a process for reproducing data using at least one playitem (PlayItem) in the playlist file is referred to as a main path, and a process for reproducing data using individual sub-play items (SubPlayItem) is referred to as a sub-path. The playlist file must contain a single main path. The playlist file may contain at least one sub-path according to the presence or absence of the sub-playitem (SubPlayItem) as necessary.

In conclusion, the playlist file acts as a basic reproduction/management file unit contained in overall reproduction/management file structures for reproducing a desired clip by combination of one or more playitems (PlayItem).

The backup directory (BACKUP) stores a plurality of duplicate files, i.e., a duplicate file (also called "copied files") of the index file "index" storing information associated with disc reproduction, a duplicate file of the object file "MovieObject", duplicate files of all playlist files (*.mpls) contained in the playlist directory (PLAYLIST), and duplicate files of all clip-info files (*.clpi) contained in the clip-info directory (CLIPINF). If the above-mentioned files ("index", "MovieObject", "*.mpls", and "*.clpi") are damaged, a disc reproduction process is also fatally damaged, such that the backup directory (BACKUP) is designed to pre-store duplicate files of the above-mentioned files as backup files.

In association with the above-mentioned description, a method for reproducing a specific title using the above-mentioned disc file structure is shown in FIG. 2.

If a user enters a title reproduction command in association with a title used as an index file (also called "index table"), reproduction of the title begins. A detailed description thereof will hereinafter be described.

The index file (index.bdmv) includes first playback information "First Playback" indicative of information associated with a first reproduction image when data of a corresponding disc is loaded, top menu information "Top Menu" for providing a menu image, and at least one title information "Title #1-Title #n".

If the disc 30 is loaded in the optical recording/reproducing device 10, title menu information associated with the index table is provided to the user via the display 20. If the user selects a specific title or a specific menu contained in a menu image, data reproduction begins according to a scenario pre-defined by a disc manufacturer. In other words, if the user enters a command for reproducing a specific title (e.g., title #1), a specific playlist file is executed according to a command contained in the object file (MovieObject) of the reproduction/management file structure. Thereafter, one or more clips (e.g., Clip #1-Clip #3) constructing the title #1 are reproduced by a specific playitem and/or sub-playitem contained in the playlist file according to the playlist file information.

Figure 3:
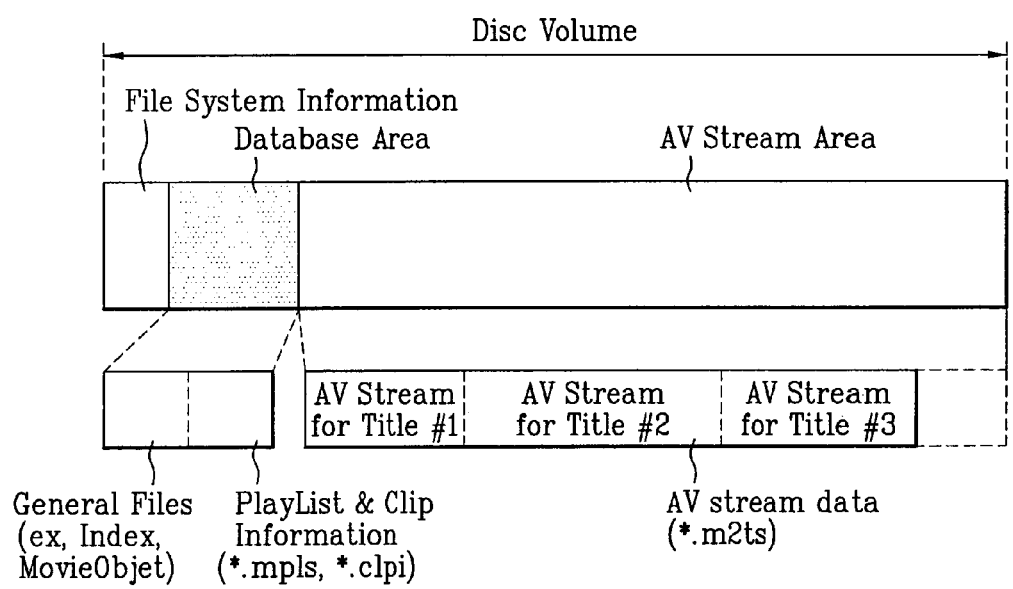
FIG. 3 is a structural diagram illustrating a data record structure of an optical disc acting as a recording medium according to the present invention.

FIG. 3 is a structural diagram illustrating a data record structure recorded in a recording medium according to the present invention. In more detail, FIG. 3 shows a disc record format of information associated with the file structure. As shown in FIG. 3, from the viewpoint of an inner area of the disc, the above-mentioned disc structure sequentially includes a file system information area serving as system information for managing overall files, a database area for recording a playlist file and a clip-info file to reproduce a recorded AV stream (*.m2ts), and an AV stream area for recording a plurality of streams composed of audio data, video data, and graphic data, etc. Particularly, it should be noted that data recorded in the AV stream area may be determined to be original data as previously stated above.

The present invention provides a method and apparatus for simultaneously reproducing original data (e.g., a file structure shown in FIG. 2) recorded in the disc and additional data recorded in the local storage, and a variety of preferred embodiments according to the present invention will hereinafter be described.

Figure 4A:
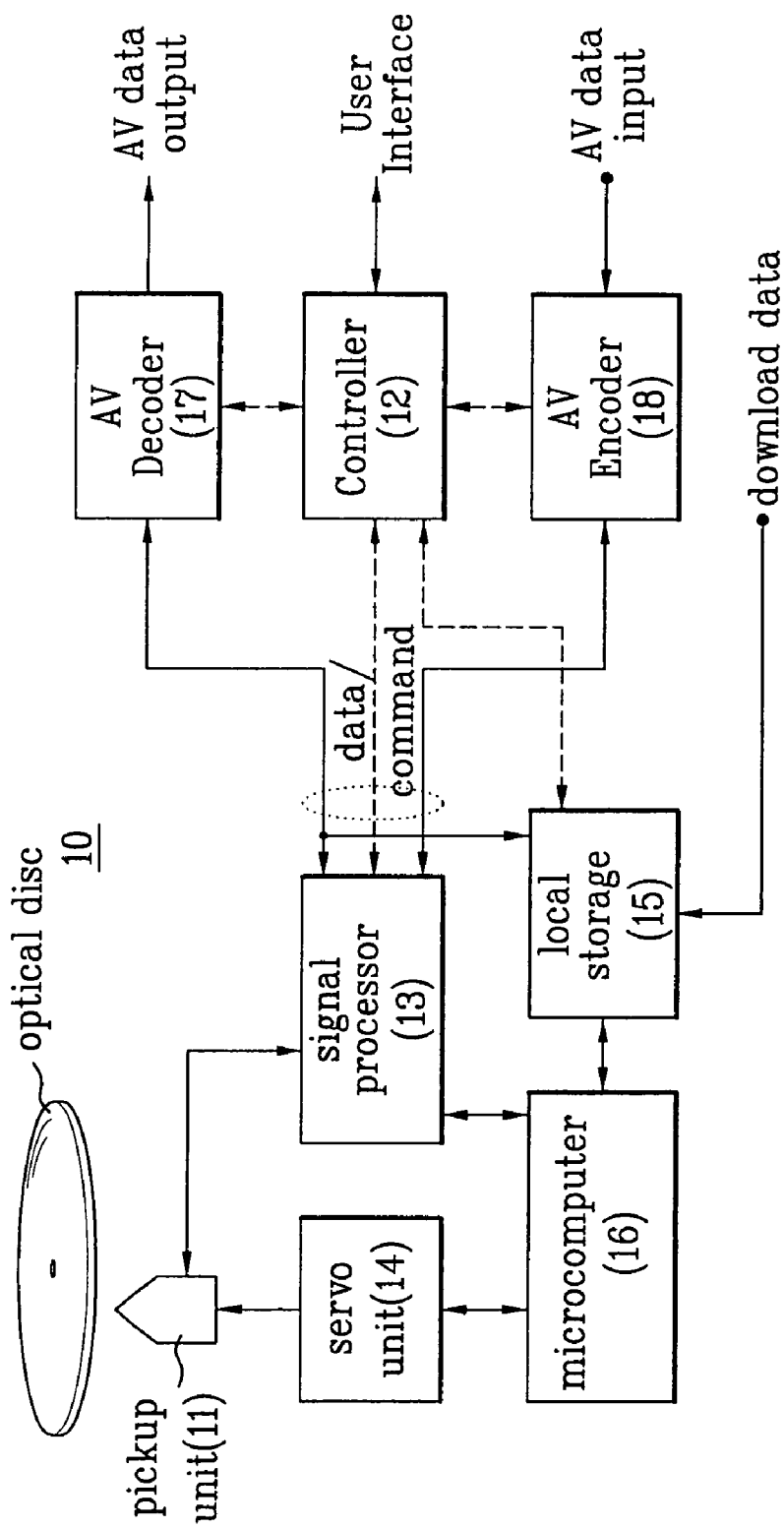
FIG. 4a is a block diagram illustrating an optical recording/reproducing device according to the present invention.

FIG. 4a is a block diagram illustrating the optical recording/reproducing device 10 according to the present invention.

Referring to FIG. 4a, the optical recording/reproducing device 10 includes a pickup unit 11, a servo unit 14, a signal processor 13, and a microprocessor 16. The pickup unit 11 reproduces original data recorded in the optical disc and management information including reproduction/management file information. The servo unit 14 controls operations of the pickup unit 11. The signal processor 13 receives a reproduction signal from the pickup unit 11, restores the received reproduction signal to a desired signal value, or modulates a signal to be recorded into another signal recorded in the optical disc, such that it transmits the restored or modulated result. The microprocessor 16 controls mutual operations of the above-mentioned components.

A controller 12 downloads additional data existing outside of the optical disc upon receiving a command from a user, stores the downloaded additional data in the local storage 15, and configures a virtual file system (VFS) to reproduce the original data recorded in the optical disc and the additional data stored in the local storage. The controller 12 forms a virtual package including the original data and associated additional data using the VFS, and reproduces the original data and/or the additional data using the formed virtual package upon receiving a request from a user.

The virtual package formed by the controller 12 includes at least one virtual playlist including a playitem capable of reproducing a plurality of clips.

In association with the above-mentioned description, a detailed description of the VFS and the virtual package will hereinafter be described with reference to drawings from FIG. 5.

A decoder 17 finally decodes output data (i.e., original data and/or additional data) upon receiving a control signal from the controller 12, and provides the user with the decoded result.

An encoder 18 converts an input signal into a specific format signal (e.g., an MPEG2 transport stream) upon receiving a control signal from the controller 12, and transmits the converted result to the signal processor 13.

The new virtual package may be stored in the local storage 15 such that it can be re-used in future. Also, the new virtual package may be temporarily stored in an additional dynamic memory, and may then be used.

FIG. 4b is a block diagram illustrating an apparatus for reproducing data of an optical disc using a local storage from among overall components contained in the optical recording/reproducing device 10 according to the present invention.

Information stored in the local storage 15 will hereinafter be described. The local storage 15 according to the present invention stores file information (Directory-File Tree Information for Disc_id #n) including directories and files for every individual disc identification (ID) information, and a plurality of additional clips downloaded from an external part. The local storage 15 may further store binding information for a binding operation associated with a disc package, and a plurality of files (Content Identifying Info files) for explaining content data stored in the local storage 15.

Specifically, the local storage 15 may include a plurality of file information units (Directory-File Tree Information for Disc_id #n) to cope with different discs. Therefore, the local storage 15 additionally requires a file system for managing the above-mentioned file information units. Specifically, the file system is also referred to as a local storage file system 41, and the local storage file system 41 is indicative of a system for managing all files stored in the local storage 15.

Therefore, if an optical disc of a specific disc ID (Disc_id) is loaded in the optical recording/reproducing device 10, the controller 12 contained in the optical recording/reproducing device 10 recognizes ID information of the disc using the pickup unit 11 and the signal processor 13, reads file information equal to the loaded disc ID information from among all file information units stored in the local storage 15, forms a virtual package by binding (or combining) the read information and the disc package, and reproduces both the original data of the disc and the additional data of the local storage using the formed virtual package.

A preferred embodiment for generating the virtual package according to the present invention will hereinafter be described.

Figure 5:
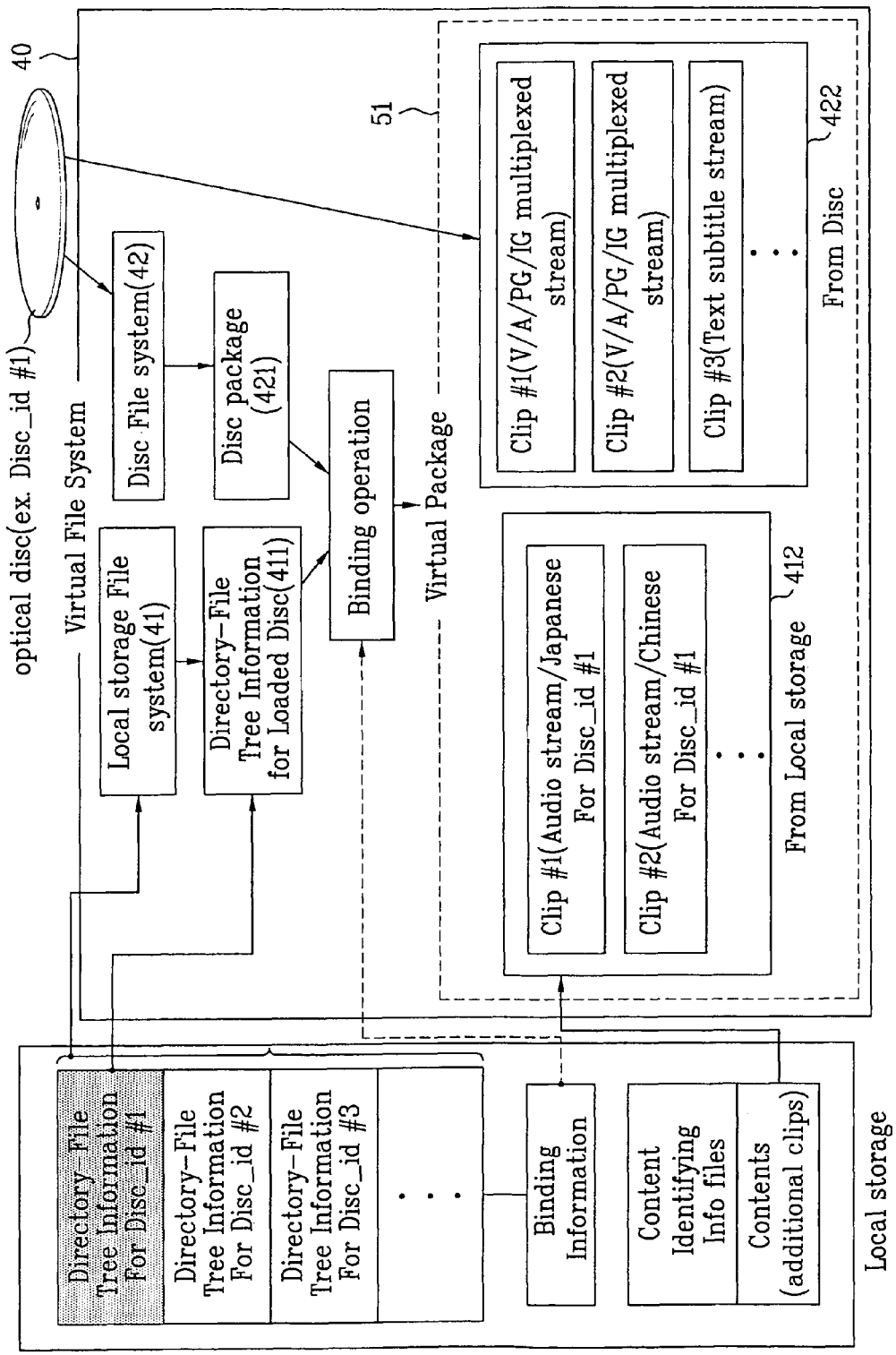
FIG. 5 is a conceptual diagram illustrating a method for forming a virtual package capable of reproducing data recorded in a recording medium and data recorded in a local storage according to the present invention.

FIG. 5 is a conceptual diagram illustrating a method for forming the above-mentioned virtual package according to the present invention.

If a specific disc is loaded in the optical recording/reproducing device 10 on the condition that the information and contents shown in FIG. 4b are stored in the local storage 15, the optical recording/reproducing device 10 reads the file system information 41 contained in the local storage 15, and at the same time reads disc file system information 42 including the file structure recorded in the disc, resulting in the creation of the VFS. In more detail, the virtual file system (VFS) is indicative of a file system virtually formed to manage both the file system contained in the local storage 15 and the other file system of the loaded disc.

The optical recording/reproducing device forms a new virtual package to simultaneously reproduce original data recorded in the disc and additional data recorded in the local storage using the above-mentioned virtual file system (VFS). For this purpose, the optical recording/reproducing device 10 reads file information (Directory-File Tree Information for Disc_id #n) associated with the disc (e.g., Disc_id #1) from the file system, and performs a binding operation for combining the read file information with a disc package of the loaded disc (Disc_id #1) or adding the read file information to the disc package.

The virtual package formed by the above-mentioned binding operation is indicative of a file structure for reproducing/managing an original clip 422 and an additional clip 412. The original clip 422 is composed of original data recorded in the disc. The additional clip 412 is composed of additional data recorded in the local storage.

Figure 6:
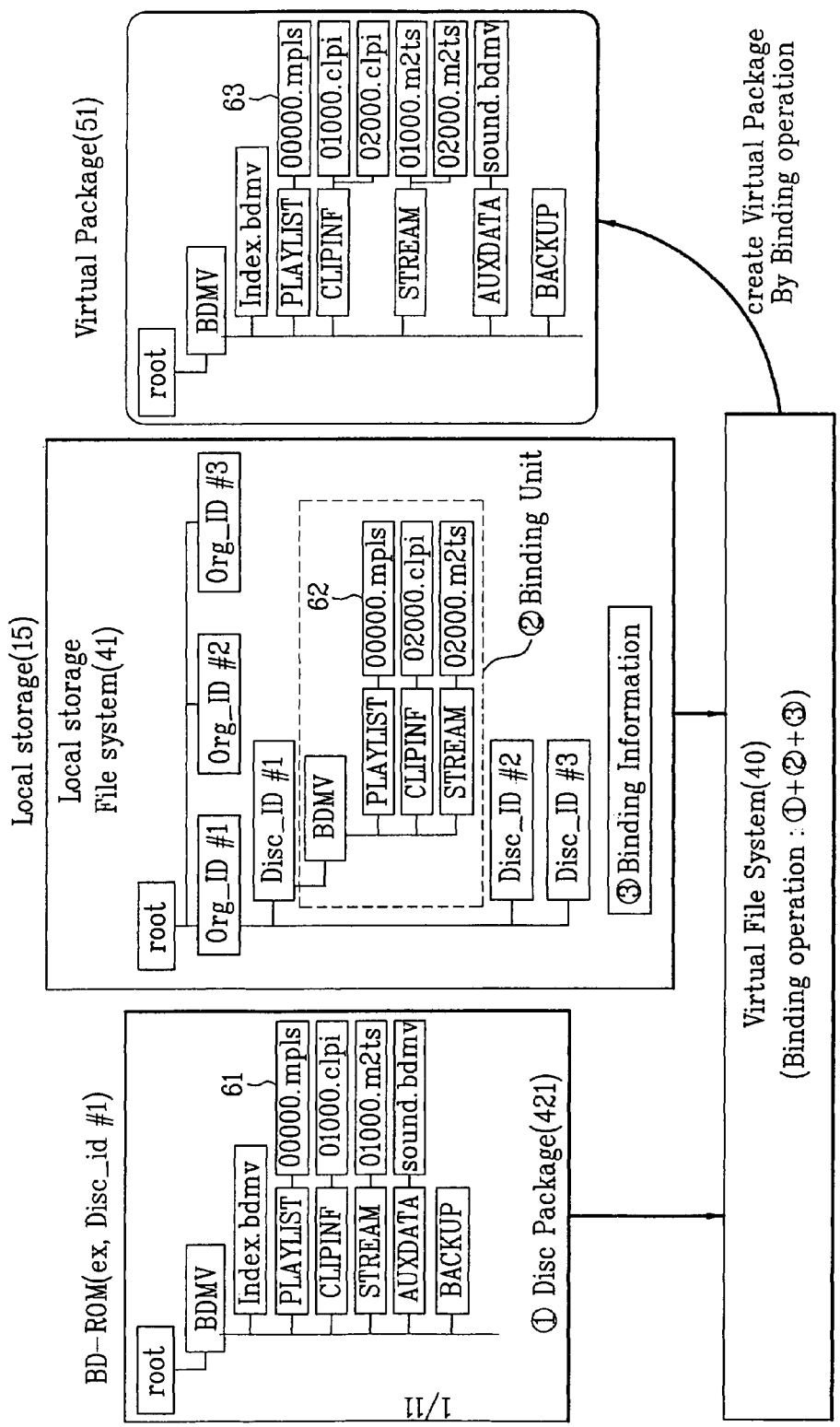
FIG. 6a is a conceptual diagram illustrating a method for forming the virtual package using a virtual file system (VFS) on the basis of a file structure according to the present invention.
FIG. 6b exemplarily shows a variety of additional data types stored in a local storage according to the present invention.

FIG. 6a is a conceptual diagram illustrating a method for forming the virtual package using a virtual file system (VFS) on the basis of a file structure according to the present invention.

Referring to FIG. 6a, a specific file structure (i.e., the disc package of FIG. 2) is recorded in the loaded disc. A local storage file system 41 is contained in the local storage. The local storage file system 41 includes a binding unit and binding information, which are combined with the loaded disc (e.g., Disc_id #1).

In association with the above-mentioned description, the binding unit is similar to the disc package. Specifically, the binding unit may include a playlist file having the same name as that of a specific playlist file contained in the disc, such that it can be combined with the specific playlist file.

However, it should be noted that the binding unit cannot be operated as a reproduction/management file by itself, differently from the disc package. If it is assumed that the binding unit is designed to perform data reproduction by itself, this data reproduction is similar to data reproduction of the local storage, such that the above-mentioned operations of the binding unit are contrary to the purpose of the present invention for simultaneously reproducing both original data recorded in the disc and additional data recorded in the local storage.

The binding information includes a variety of information units associated with the binding unit, for example, file types of the binding unit, update times of the binding unit, and a binding method, etc.

Therefore, the virtual file system (VFS) performs a binding operation for combining the binding unit with the disc package of the loaded disc using the above-mentioned binding information, such that it forms a new virtual package.

For example, if the binding unit associated with the loaded disc (e.g., Disc_id #1) includes a first playlist file (00000.mpls), a clip (i.e., clip-info file "02000.clpi") managed by the first playlist file (00000.mpls), and a stream file (02000.m2ts), the first playlist file (00000.mpls) contained in the binding unit is combined with a second playlist file (00000.mpls) contained in the disc package, resulting in the creation of a virtual package including a new playlist file (00000.mpls). In this case, the second playlist file (00000.mpls) has the same file name as that of the first playlist file (00000.mpls)).

For the convenience of description, it should be noted that the playlist file 61 contained in the disc package is referred to as an original playlist file 62 (Original PLayList), the playlist file 62 contained in the binding unit is referred to as an additional playlist file (additional PlayList), and the playlist file 63 formed by combining the original playlist file 61 with the additional playlist file 62 is referred to as a virtual playlist file 63 (virtual PlayList).

The clip-info files (*.clpi) and the stream files (*.m2ts) other than the virtual playlist file 63 in the virtual package are contained in the virtual package so as to achieve their unified management only. Individual contents of the clip-info files (*.clpi) and the stream files (*.m2ts) are not changed by the binding operation. In more detail, the clip-info file (01000.clpi) and the stream file (01000.m2ts) in the disc package are simply combined with the clip-info file (02000.clpi) and the stream file (02000.m2ts) in the binding unit without any change, such that the combined results are contained in the virtual package.

In association with the above-mentioned description, the index file (index) and the object file (MovieObject) (not shown) act as upper files, and may be updated from a conventional index file (index) and a conventional object file (MovieObject) on the basis of the virtual playlist file 63. The above-mentioned update operation occurs when the title is changed to another by the virtual playlist file 63. For example, if the addition of a new title, the deletion of a conventional title, or the change of a title reproduction scenario occurs, the above-mentioned update operation of the index and object files (index, MovieObject).

The file system structure 41 contained in the local storage includes a file structure for managing downloaded additional data. For example, the file structure includes "Org_id" directories for every content provider (CP) for providing additional data, and "Disc_id" directories for every specific disc in each of the Org_id" directories.

The "Disc_id" directories are configured in the form of a hierarchial structure. Provided that the "Org_id #1" directory is determined to be a directory of a specific company "A" providing contents, the directories "Disc_id #1"-"Disc_id #3" are configured according to disc types provided from the "A" company, and the user downloads additional data associated with the "Disc_id #1" directory, the downloaded additional data is contained in the binding unit contained in the above-mentioned "Disc_id #1" directory. It will be obvious to those skilled in the art that the binding unit can also be composed of only the "Disc_id" directories other than the "Org_id" directories.

A method for forming the virtual playlist file 63 contained in a virtual package using the above-mentioned binding operation will hereinafter be described with reference to FIGS. 7 and 8.

As stated above, the virtual package has the same structure as the disc package. Specifically, the virtual package includes a virtual playlist file 63 newly formed by the binding operation. By a reproduction/management method of the newly-formed virtual playlist file 63, an original clip (e.g., a clip-info file (01000.clpi)) and a stream file (01000.m2ts) in the virtual package are selectively reproduced, and/or an additional clip (e.g., a clip-info file (02000.clpi)) and a stream file (02000.m2ts) in the local storage are selectively reproduced.

Therefore, the virtual playlist file 63 contained in the virtual package serves as a basic reproduction/management file for simultaneously reproducing both original data recorded in the disc and additional data recorded in the local storage.

FIG. 6b exemplarily shows a variety of additional data types stored in the local storage according to the present invention. Specifically, FIG. 6b shows five additional data types according to additional data attributes.

Firstly, the additional data type #1 includes a plurality of data units for assisting the original data, for example, audio data, presentation graphic (PG) data, interactive graphic (IG) data, and text subtitle data (Text Subtitle), etc. The additional data type #1 may be combined with the original playlist file 61 via a sub-path contained in the additional playlist file 62. However, the present invention shows an example in which the additional data type #1 is combined with the original playlist file 61 via a main path, and a detailed description thereof will hereinafter be described with reference to FIGS. 7 and 8.

Secondly, the additional data type #2 includes a plurality of multiplexed-clip AV streams which are replaced with original data or are appended to the original data. The additional data type #2 is mainly combined with the original playlist 61 via a main path contained in the additional playlist 62.

Thirdly, the additional data type #3 includes a plurality of data units (denoted by "Database only") associated with conversion of a reproduction scenario for reproducing original data. For example, in the case where the order of the playitems contained in the playlist is changed, or the index file (index) or the object file (MovieObject) is changed, this means that only a reproduction/management file is changed/added with the absence of an actual additional clip. The above-mentioned additional data type #3 is associated with the above-mentioned case.

The additional data type #3 is combined with the original playlist 61 using a main path contained in the additional playlist 62 according to a changed scenario, or is combined with the original index file (index) or the original object file (MovieObject) in the disc file structure using the additional index file (index) and/or the additional object file (MovieObject).

Fourthly, the additional data type #4 includes a plurality of data units (Auxdata) associated with the auxiliary directory (AUXDATA) contained in the file structure. For example, the additional data type #4 is associated with the addition of click sound information or the addition of a font file for a text subtitle.

The additional data type #4 is combined with the original sound file (sound.bdmv) or the original font file (*.otf) in the disc file structure using the additional sound file (sound.bdmv) and/or the additional font file (*.otf).

Fifthly, the additional data type #5 includes a plurality of data units used as system reproduction information. For example, the additional data type #5 is associated with Java application data (indicative of a BD reproduction mode) and/or metadata used as system information. The additional data type #5 is combined with associated data contained in a system.

Particularly, text subtitle data and preloaded IG (Interactive Graphic) data from among presentation components capable of assisting the original data, and disc content data are defined in the playlist file via a sub-path, such that downloaded components are combined with each other via new sub-paths.

On the contrary, audio data, PG (Presentation Graphic) data, and non-preloaded IG (Interactive Graphic) data is able to use one of two methods, i.e., a first method capable of defining the audio data, the PG data, and the non-preloaded IG data in the playlist file, and a second method capable of allowing a playitem to refer to a plurality of audio data units, the PG data, and the non-preloaded IG data. The aforementioned first method will be described with reference to FIG. 7, and the aforementioned second method will be described with reference to FIG. 8.

Figure 7:
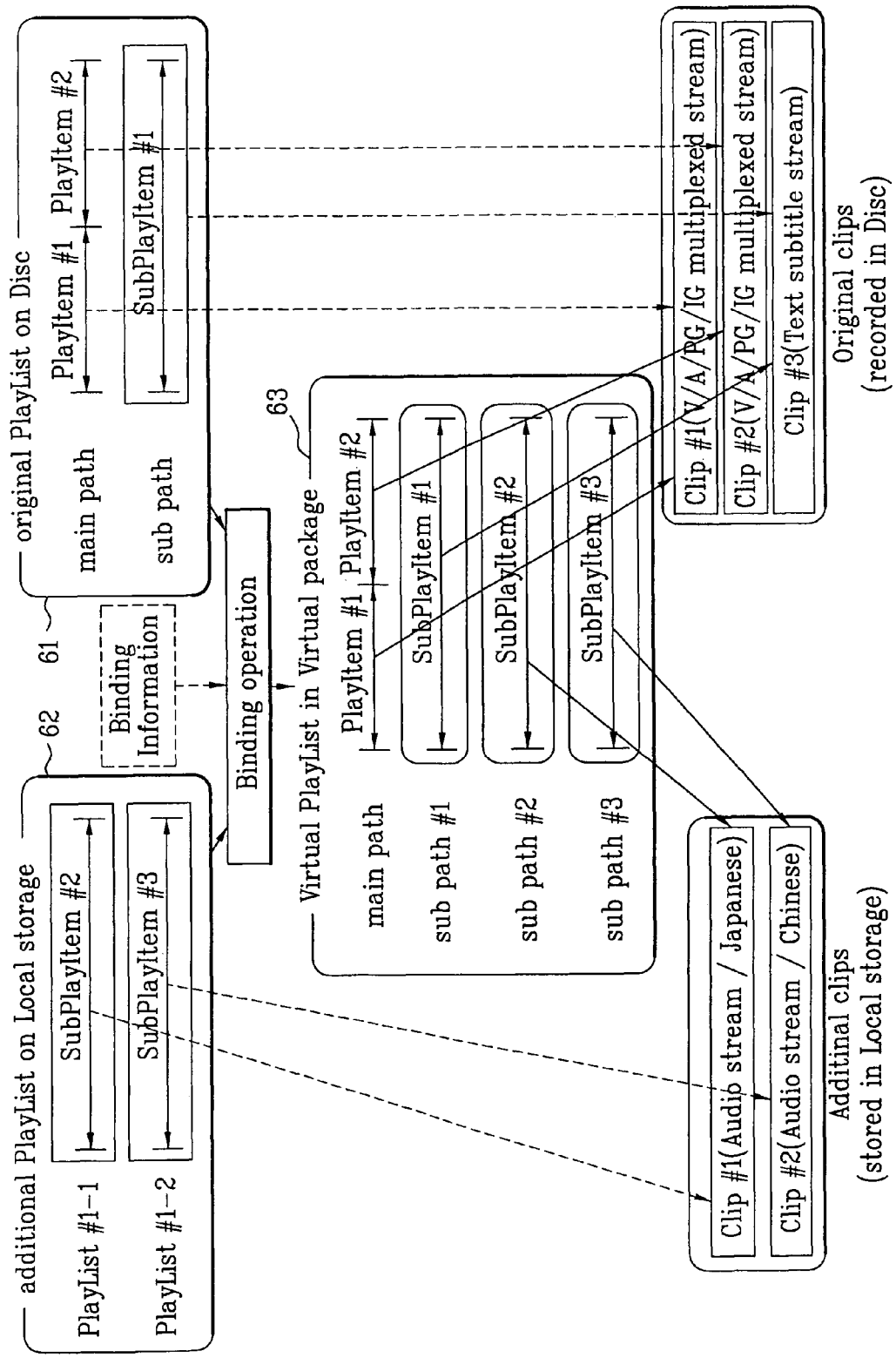
FIG. 7 is a conceptual diagram illustrating a method for forming a virtual playlist (Virtual PlayList) contained in the virtual package in accordance with a first preferred embodiment of the present invention.

FIG. 7 is a conceptual diagram illustrating a method for forming a virtual playlist (Virtual PlayList) 63 contained in the virtual package in accordance with a first preferred embodiment of the present invention. Particularly, a method for employing a sub-path is shown in FIG. 7.

Referring to FIG. 7, the original playlist 61 in the disc includes two playitems (PlayItems #1 and #2) contained in a main path and a single sub-playitem (SubPlayItem #1) contained in a sub-path. The original clip #1 indicative of a multiplexed AV stream is reproduced/managed by the playitem #1 contained in the main path. The original clip #2 indicative of a multiplexed AV stream is reproduced/managed by the playitem #2 contained in the main path. In this case, each multiplexed AV stream includes video data, audio data, and graphic data. Also, the original clip #3 constructing the text subtitle stream is reproduced/managed by the sub-playitem #1 (SubPlayItem #1) contained in the sub-path.

For example, the additional playlist 62 contained in the local storage does not include a main path, and includes a sub-playitem #2 (SubPlayItem #2) contained in a first playlist (Playlist #1-1) and a sub-playitem #3 (SubPlayItem #3) contained in a second playlist (Playlist #1-2). The additional clip #1 constructing a Japanese audio stream is reproduced/managed by the sub-playitem #2 (SubPlayItem #2) contained in the playlist #1-1 (PlayList #1-1). The additional clip #2 constructing a Chinese audio stream is reproduced/managed by the sub-playitem #3 (SubPlayItem #2) contained in the playlist #1-2 (PlayList #1-2).

Therefore, the virtual playlist 63 is formed by combining the original playlist 61 with the additional playlist 62. In this case, the virtual playlist 62 is formed using the binding information.

In other words, a binding method can be determined by the above-mentioned binding information. For example, a binding method for adding two playlists (PlayList #1-1 and PlayList #1-2) contained in the additional playlist 62 to the original playlist 61 can also be determined by the binding information. However, it should be noted that the aforementioned binding information is not always required, and the binding operation can be performed by a predetermined binding method even though there is no binding information.

Therefore, when the virtual file system (VFS) performs the binding operation, it forms a new virtual playlist 63 by referring to the original and additional playlists 61 and 62 and/or the binding information, such that the virtual package including at least one newly-formed virtual playlist 63 is formed.

In the above-mentioned case, the main path contained in the newly-formed virtual playlist 63 has the same structure as that of the original playlist 61. The sub-path #1 has the same structure as that of the sub-path contained in the original playlist 61. The sub-path #2 and the sub-path #3 have the same structures as those of the playlists (PlayList #1-1 and PlayList #1-2) contained in the additional playlist 62.

In association with the above-mentioned description, the newly-formed virtual playlist 63 requires specific information for managing streams contained in the single main path and streams contained in three sub-paths. The specific information is referred to as "STN_Table" or "PID_table" information. Type and attribute information of streams selectable by a user are contained in the "STN_Table" or "PID_table" information. The system provides the user with information for allowing a specific sub-path to be selectively reproduced by the user with reference to the above-mentioned type and attribute information of the user-selected streams.

In association with the above-mentioned description, although the number of sub-paths contained in the virtual playlist 63 can be determined to be a plural number without any limitation, there is a limitation in the number of sub-paths capable of being simultaneously processed when the reproduction operation is performed via sub-paths. Generally, the number of sub-paths is pre-defined in system specifications. For example, the number of sub-paths may be set to a predetermined number of 2, such that only two sub-paths can be simultaneously processed.

Figure 8:
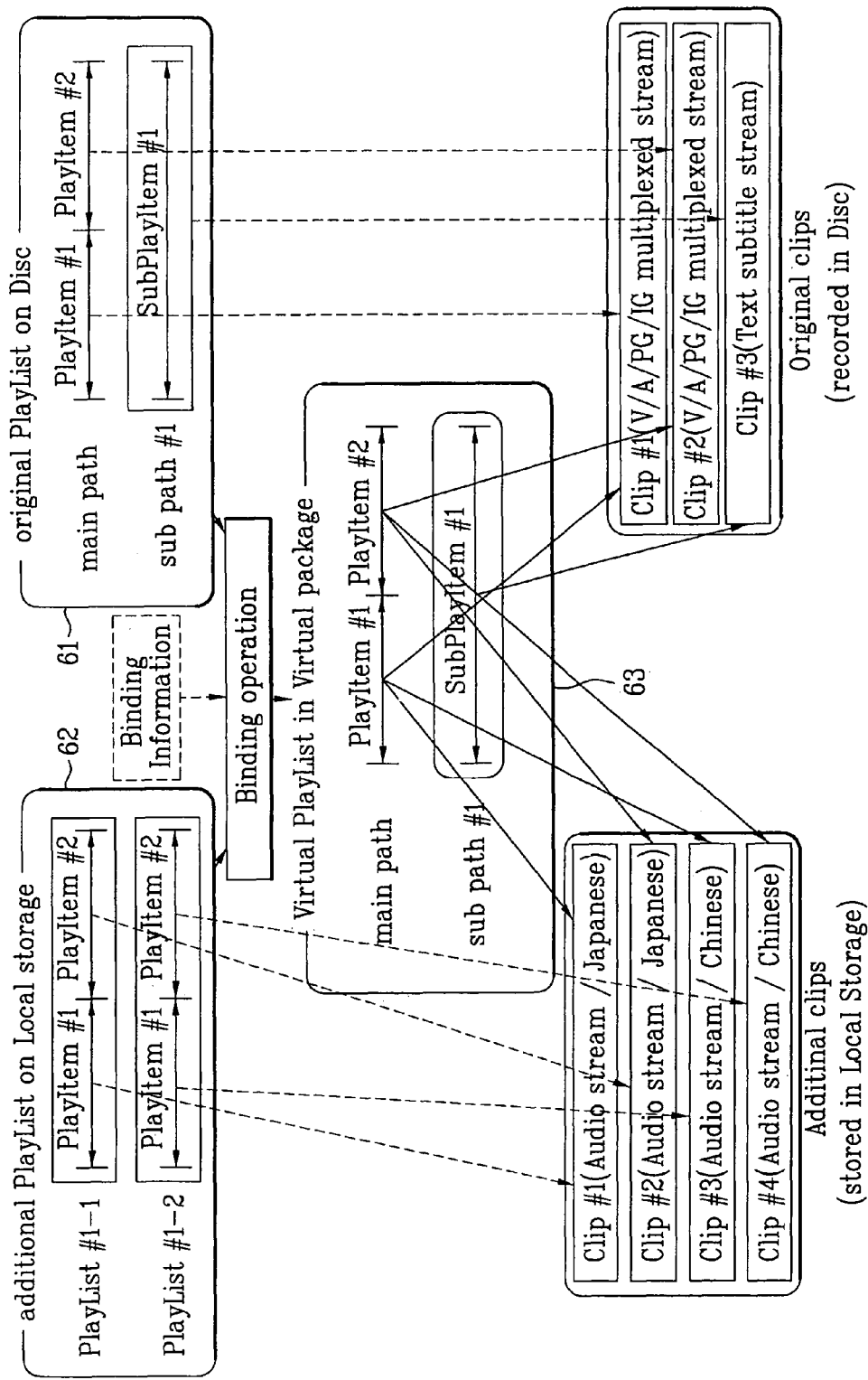
FIG. 8 is a conceptual diagram illustrating a method for forming a virtual playlist (Virtual PlayList) contained in the virtual package in accordance with a second preferred embodiment of the present invention.

FIG. 8 is a conceptual diagram illustrating a method for employing a main path according to the second preferred embodiment for forming the virtual playlist 63.

Specifically, the binding operation of the above-mentioned second method for allowing the first playitem (PlayItem) to reproduce a plurality of audio data units, PG data, and non-preloaded IG data is shown in FIG. 8.

Referring to FIG. 8, the original playlist 61 in the disc includes two playitems (PlayItems #1 and #2) contained in a main path and a single sub-playitem (SubPlayItem #1) contained in a sub-path. The original clip #1 indicative of a multiplexed AV stream is reproduced/managed by the playitem #1 contained in the main path. The original clip #2 indicative of a multiplexed AV stream is reproduced/managed by the playitem #2 contained in the main path. In this case, each multiplexed AV stream includes video data, audio data, and graphic data. Also, the original clip #3 constructing the text subtitle stream is reproduced/managed by the sub-playitem #1 (SubPlayItem #1) contained in the sub-path.

For example, the additional playlist 62 contained in the local storage includes two playitems (PlayItems #1 and #2) contained in the playlist #1-1 (PlayList #1-1). The additional clip #1 such as a Japanese audio stream is reproduced/managed by the playitem #1 (PlayItem #1) contained in the playlist #1-1 (PlayList #1-1). The additional clip #2 such as a Japanese audio stream is reproduced/managed by the playitem #2 (PlayItem #2) contained in the playlist #1-1 (PlayList #1-1).

For another example, the additional playlist 62 contained in the local storage includes two playitems (PlayItems #1 and #2) contained in the playlist #1-2 (PlayList #1-2). The additional clip #3 such as a Chinese audio stream is reproduced/managed by the playitem #1 (PlayItem #1) contained in the playlist #1-2 (PlayList #1-2). The additional clip #4 such as a Chinese audio stream is reproduced/managed by the playitem #2 (PlayItem #2) contained in the playlist #1-2 (PlayList #1-2).

In association with the above-mentioned description, it is obvious to those skilled in the art that not only the aforementioned audio stream, but also PG data and non-preloaded IG data can be used as the aforementioned additional clip.

In addition, a binding method can be determined by the above-mentioned binding information. For example, a binding method for combining the playitem #1 contained in the original playlist 61 with both the playitem #1 of the playlist #1-1 contained in the additional playlist 62 and the other playitem #1 of the playlist #1-2 contained in the original playlist 61 can be determined by the binding information. Also, a binding method for combining the playitem #2 contained in the original playlist 61 with both the playitem #2 of the playlist #1-1 contained in the additional playlist 62 and the other playitem #2 of the playlist #1-2 contained in the original playlist 61 can be determined by the binding information.

However, it should be noted that the aforementioned binding information is not always required, and the binding operation can be performed by a predetermined binding method even though there is no binding information, as previously stated above.

Therefore, the finally-formed virtual playlist 63 includes the playitem #1 capable of reproducing/managing the original clip #1, the additional clip #1, and the additional clip #3 in the main path, and also includes the playitem #2 capable of reproducing/managing the original clip #2, the additional clip #2, and the additional clip #4 in the main path. Also, the finally-formed virtual playlist 63 includes a sub-playitem #1 (SubPlayItem #1) for reproducing/managing the original clip #3 in the sub-path.

Therefore, the present invention allows a single playitem to reproduce a plurality of clips in a virtual playlist formed by the binding operation. In this way, the binding operation is performed by extending the playitem, and the virtual playlist is formed without the addition of a new sub-path, such that the original data and the additional data can be reproduced by the virtual playlist.

In association with the above-mentioned description, the user can select a desired menu from among a plurality of menus, such that individual playitems (PlayItems) contained in the virtual playlist can selectively reproduce data stored in a recording medium and/or data stored in the local storage.

Figure 9:
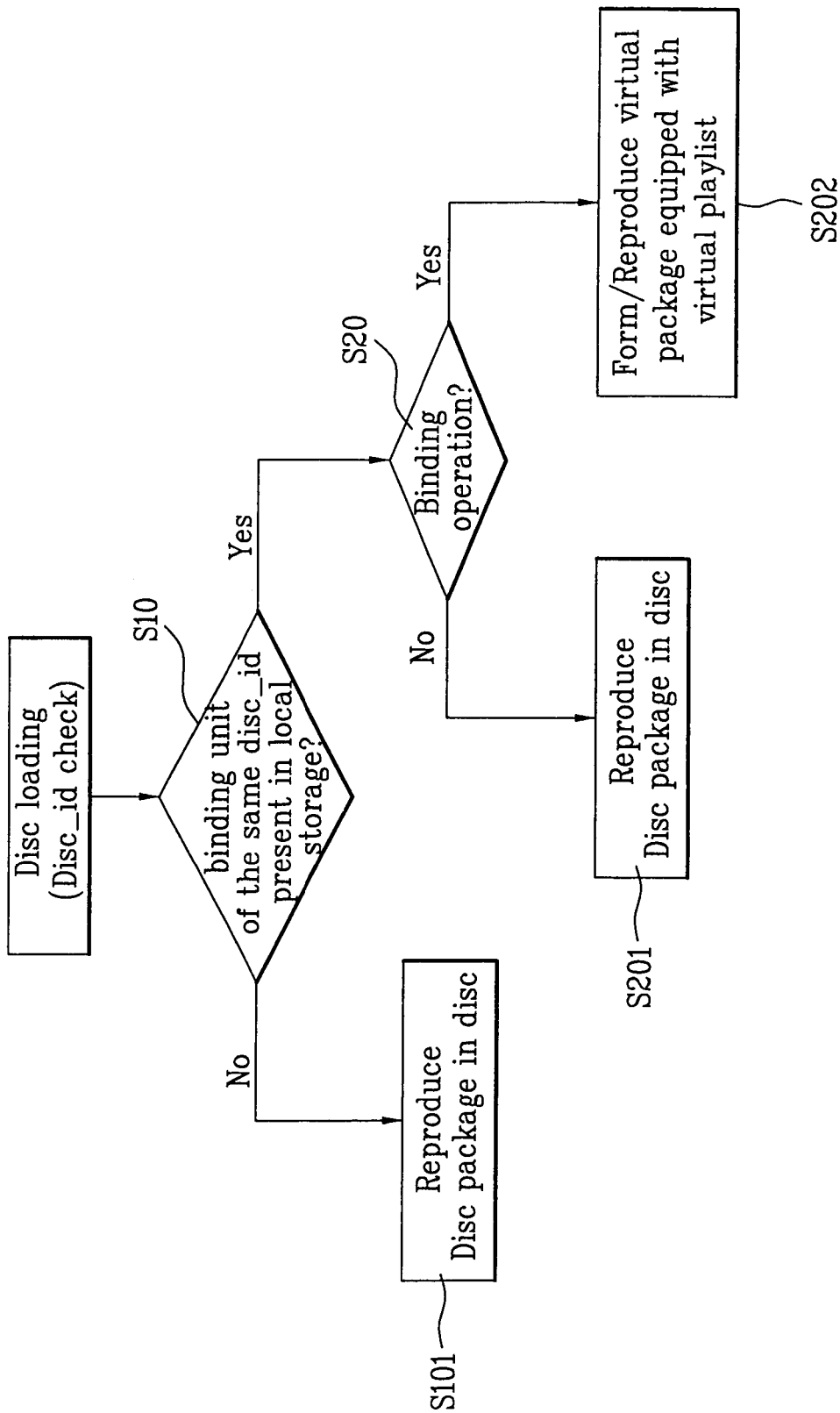
FIG. 9 is a flow chart illustrating a method for reproducing data from a recording medium using a local storage according to the present invention.

FIG. 9 is a flow chart illustrating a method for reproducing data from a recording medium using a local storage according to the present invention. Referring to FIG. 9, if a disc is loaded in an optical recording/reproducing device, the optical recording/reproducing device recognizes disc ID information (Disc_id), and determines whether additional data including a binding unit, which has the same disc ID information (Disc_id) as that of the loaded disc, is present in the local storage at step S10.

If it is determined that the binding unit is present in the local storage at step S10, the optical recording/reproducing device determines whether the binding operation for combining the binding unit with a file structure contained in a recording medium is performed at step S20. The optical recording/reproducing device forms the virtual package using the binding operation, and reproduces original data recorded in the disc and/or additional data recorded in the local storage using the formed virtual package at step S202.

In association with the above-mentioned description, in the case of forming the virtual package using the aforementioned binding operation, the virtual playlist contained in the virtual package performs a binding operation such that a single playitem contained in the main path can reproduce a plurality of clips (i.e., original and additional clips).

If the binding unit is not present in the local storage at step S10, the optical recording/reproducing device reproduces original data using only the disc package recorded in the disc at step S101. If the binding operation is not required at step S20, the optical recording/reproducing device reproduces original data using only the disc package recorded in the disc at step S201.

Preferably, a predetermined step, which determines whether the loaded disc type is indicative of a disc for allowing disc data to be simultaneously reproduced along with additional data recorded in the local storage, may be further positioned prior to the above step S10. For example, provided that a disc (e.g., a BD-ROM) having version information of at least Version 1.1 is loaded in the optical recording/reproducing device, the reproduction method shown in FIG. 9 is performed. Otherwise, provided that a disc (e.g., a BD-ROM) having version information of Version 1.0 or less is loaded in the optical recording/reproducing device, the above-mentioned reproduction method shown in FIG. 9 is not performed, but the optical recording/reproducing device reproduces only the original data recorded in the disc.

As apparent from the above description, a method and apparatus for reproducing data from a recording medium using a local storage, a method for forming a virtual package, and a method for forming a virtual playlist according to the present invention can effectively reproduce the original data recorded in the recording medium and the additional data stored in the local storage, resulting in the creation of more convenient functions for a user.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for reproducing data of a recording medium using a local storage of a reproducing apparatus, the method comprising:
    loading the recording medium storing a recording medium file structure on the reproducing apparatus, the recording medium file structure including an original clip and an original playlist file for managing the original clip;
    downloading data associated with the recording medium from an external source;
    storing the downloaded data in the local storage, the downloaded data including a binding unit associated with the recording medium, the binding unit including an additional clip and an additional playlist file for managing the additional clip;
    performing a binding operation for combining the binding unit with the recording medium file structure to form a virtual file structure, the virtual file structure including a virtual playlist file for managing both of the original clip and the additional clip, which is formed by combining the original playlist file and additional playlist file; and
    reproducing the original clip and/or the additional clip using the formed virtual file structure.

2. The method according to claim 1, wherein the binding unit includes file information which has the same identification (ID) information as that of the recording medium.

3. The method according to claim 1, wherein the original playlist file includes a first playitem designating a playing interval in the original clip, the additional playlist file includes a second playitem designating a playing interval in the additional clip, and the virtual playlist file includes a third playitem designating playing intervals in each of the original clip and the additional clip.

4. The method according to claim 1, wherein the downloaded data includes an audio stream.

5. The method according to claim 1, wherein the downloaded data includes graphic (PG) data.

6. The method according to claim 1, wherein the downloaded data includes interactive graphic (IG) data.

7. The method according to claim 1, wherein the original playlist file includes a first sub-playitem designating a playing interval in the original clip, the additional playlist file includes a second sub-playitem designating a playing interval in the additional clip, and the virtual playlist file includes the first sub-playitem and the second sub-playitem.

8. The method according to claim 7, wherein the downloaded data includes a multiplexed stream of the remaining data other than video data.

9. The method according to claim 1, wherein the local storage further stores binding information for the binding operation.

10. The method according to claim 1, further comprising:
    determining whether the recording medium stores data capable of being simultaneously reproduced along with the data stored in the local storage.

11. A method for forming a virtual file structure, the method comprising:
    loading a recording medium storing a recording medium file structure on the reproducing apparatus, the recording medium file structure including an original clip and an original playlist file for managing the original clip;
    downloading data associated with the recording medium from an external source;
    storing the downloaded data in a local storage of a reproducing apparatus, the downloaded data including a binding unit associated with the recording medium, the binding unit including an additional clip and an additional playlist file for managing the additional clip;
    reading the recording medium file structure a file structure from the recording medium;
    reading the binding unit from the local storage; and
    performing a binding operation for combining the binding unit with the recording medium file structure to form a virtual file structure, the virtual file structure including a virtual playlist file for managing both of the original clip and the additional clip, which is formed by combining the original playlist file and addition playlist file.

12. The method according to claim 11, wherein the virtual file structure has the same structure as that of the recording medium file structure.

13. An apparatus for reproducing data of a recording medium, the apparatus comprising:
    a pickup unit configured to read original data from the recording medium, the original data including an original clip and an original playlist file for managing the original clip;
    a local storage configured to store additional data downloaded from an external source, the additional data including a binding unit associated with the original data, the binding unit including an additional clip and an additional playlist file for managing the additional clip; and
    a controller configured to control the pick up unit and the local storage, the controller configured to perform a binding operation combining the binding unit with the original data to form a virtual file structure, the virtual file structure including a virtual playlist file for managing both of the original clip and the additional clip, which is formed by combining the original playlist file and additional playlist file.

14. The apparatus according to claim 13, wherein the binding unit includes file information which has the same identification (ID) information as that of the recording medium.

15. The apparatus according to claim 13, wherein the downloaded data includes an audio stream, graphic (PG) data and interactive graphic (IG) data.

16. The apparatus according to claim 13, wherein the original playlist file includes a first sub-playitem designating a playing interval in the original clip, the additional playlist file includes a second sub-playitem designating a playing interval in the additional clip, and the virtual playlist file includes the first sub-playitem and the second sub-playitem.

17. The apparatus according to claim 13, wherein the local storage further stores binding information for the binding operation.

18. The apparatus according to claim 13, wherein the original playlist file includes a first playitem designating a playing interval in the original clip, the additional playlist file includes a second playitem designating a playing interval in the additional clip, and the virtual playlist file includes a third playitem designating playing intervals in each of the original clip and the additional clip.

* * * * *